US010935683B2

(12) United States Patent
Habboosh et al.

(10) Patent No.: US 10,935,683 B2
(45) Date of Patent: Mar. 2, 2021

(54) SYSTEM AND METHOD FOR PROCESSING DOWNHOLE DATA IN A DRILLING OPERATION

(71) Applicant: APS Technology, Inc., Wallingford, CT (US)

(72) Inventors: Samir Habboosh, Hamden, CT (US); Sean Judge, Chester, CT (US); William Edward Turner, Durham, CT (US); Sheryl Brothers, Wethersfield, CT (US); Mary Deshon, Wallingford, CT (US); Jose Bscheider, Southbury, CT (US); Mark Roman, Orange, CT (US)

(73) Assignee: APS Technology, Inc., Wallingford, CT (US)

( * ) Notice: Subject to any disclaimer, the term of this patent is extended or adjusted under 35 U.S.C. 154(b) by 358 days.

(21) Appl. No.: 16/067,369

(22) PCT Filed: Dec. 30, 2016

(86) PCT No.: PCT/US2016/069457
§ 371 (c)(1),
(2) Date: Jun. 29, 2018

(87) PCT Pub. No.: WO2017/117516
PCT Pub. Date: Jul. 6, 2017

(65) Prior Publication Data
US 2019/0018160 A1 Jan. 17, 2019

Related U.S. Application Data

(60) Provisional application No. 62/273,404, filed on Dec. 30, 2015.

(51) Int. Cl.
*G01V 1/48* (2006.01)
*G06K 9/00* (2006.01)
(Continued)

(52) U.S. Cl.
CPC ............... *G01V 1/48* (2013.01); *E21B 47/18* (2013.01); *G01V 11/002* (2013.01);
(Continued)

(58) Field of Classification Search
CPC ........ E21B 47/18; G01V 1/48; G01V 11/002; G01V 2200/16; G01V 2210/324; G06K 9/0055
See application file for complete search history.

(56) References Cited

U.S. PATENT DOCUMENTS 5,473,321 A * 12/1995 Goodman ............... E21B 47/12
175/40
2004/0222901 A1* 11/2004 Dodge .................. G01V 11/002
340/854.3
(Continued)

FOREIGN PATENT DOCUMENTS

FR 2684826 A1 6/1993
FR 2684826 * 8/2013
(Continued)

OTHER PUBLICATIONS

Officer: Cosmin Grigorescu, International Search Report and the Written Opinion, dated Mar. 16, 2017, 12 pp.

*Primary Examiner* — Catherine T. Rastovski
(74) *Attorney, Agent, or Firm* — Offit Kurman, PA; Gregory A. Grissett

(57) ABSTRACT

A system, method, and a computer program configured to perform a method for processing drilling data. The method includes transmitting a signal with a telemetry tool to a computer processor. The method includes applying a plurality of predetermined templates to the signal. The method also includes applying a plurality of first filters to the transmitted signal. The method also includes applying one or more second, adjustable filters to the transmitted signal and to the plurality of predetermined templates. The method also
(Continued)

includes decoding the transmitted signal based on the best match between a) two or more of the plurality of predetermined templates, and b) the transmitted signal, wherein the two or more of the plurality of predetermined templates and the transmitted signal are processed through the same adjustable filter of the one or more second, adjustable filters.

29 Claims, 9 Drawing Sheets

(51) Int. Cl.
    *G01V 11/00*     (2006.01)
    *E21B 47/18*     (2012.01)

(52) U.S. Cl.
    CPC ........ *G06K 9/0055* (2013.01); *G01V 2200/16* (2013.01); *G01V 2210/324* (2013.01)

(56) References Cited

U.S. PATENT DOCUMENTS

2015/0078129 A1*   3/2015   Skoglund .............. G01S 7/5205
                                                  367/87
2018/0252097 A1*   9/2018   Skinner ................ F04B 49/065

FOREIGN PATENT DOCUMENTS

WO     WO 2013/126054     *   8/2013
WO         2016126054 A1     8/2016

* cited by examiner

SYSTEM AND METHOD FOR PROCESSING DOWNHOLE DATA IN A DRILLING OPERATION

CROSS REFERENCE TO RELATED APPLICATIONS

This application is a national phase application filed 35 U.S.C. 371 and claims the benefit of and priority to PCT Application No. PCT/US2016/069457, filed Dec. 30, 2016, which claims the benefit of and priority to U.S. Provisional Patent Application No. 62/273,404, filed Dec. 30, 2015, entitled "System and Method for Processing Downhole Data in a Drilling Operation," the contents of which are hereby incorporated by reference in their entirety.

TECHNICAL FIELD

The present disclosure relates to a system and method for processing downhole data in a drilling operation.

BACKGROUND

In signal detection, the presence of noise is a common challenge in many applications, especially when the signal-to-noise ratio (SNR) is low and the noise band is within the signal frequency range. The general approach in digital signal processing is to analyze the signal to determine the frequency components of noise and apply a series of filtering algorithms to remove the unwanted components. There is a broad range of filtering methodologies that must balance noise reduction with frequency response and signal distortion, which can result in signal instability, phase shift, and signal ripple. These effects can compound the detection of the desired signal.

SUMMARY

An embodiment of the present disclosure is a system, method, and a computer program product configured to perform a method for processing drilling data obtained via one or more downhole tools. The method includes transmitting with a signal to a computer processor, wherein the signal includes drilling data encoded therein. The method includes applying, via the computer processor, a plurality of predetermined templates to the signal. The method also includes applying a plurality of first filters to the transmitted signal. The method also includes applying one or more second, adjustable filters to the transmitted signal and to the plurality of predetermined templates. The method also includes decoding the transmitted signal based on the best match between a) two or more of the plurality of predetermined templates, and b) the transmitted signal, wherein the two or more of the plurality of predetermined templates and the transmitted signal are processed through the same adjustable filter of the one or more second, adjustable filters.

DETAILED DESCRIPTION OF ILLUSTRATIVE EMBODIMENTS

Improving data reliability during a drilling operation can yield a number of benefits, such as improved decision making, greater efficiencies, less downtime, and possibly higher drilling rate-of-penetration (ROP) through advanced signal processing techniques. The inventors recognize that utilization of a correlation engine with a template, which is representative of the desired signal, to improve detection and capture the components of interest is a powerful method used in signal processing. Embodiments of the present disclosure include methods, systems, and software applications whereby a template, which is representative of the desired signal, is used to improve detection and capture the components of interest. One or more types of adjustable filters can be used to alter both the incoming signal and the template in a similar manner or pattern, greatly enhancing signal detection. One embodiment of this invention is the utilization of an active signal template. The active template can dynamically change to reflect the signal distortion induced when adjustable filters are implemented. Thus, as the filters alter the incoming signal the template is also altered in a similar pattern, improving signal detection. The methods used herein obviate the need of more complex numerical approaches which may be required to maintain detection integrity. A less complex approach reduces the hardware requirements for effective signal processing operating in a real-time drilling environment or for analysis of recorded data.

Figure 1:
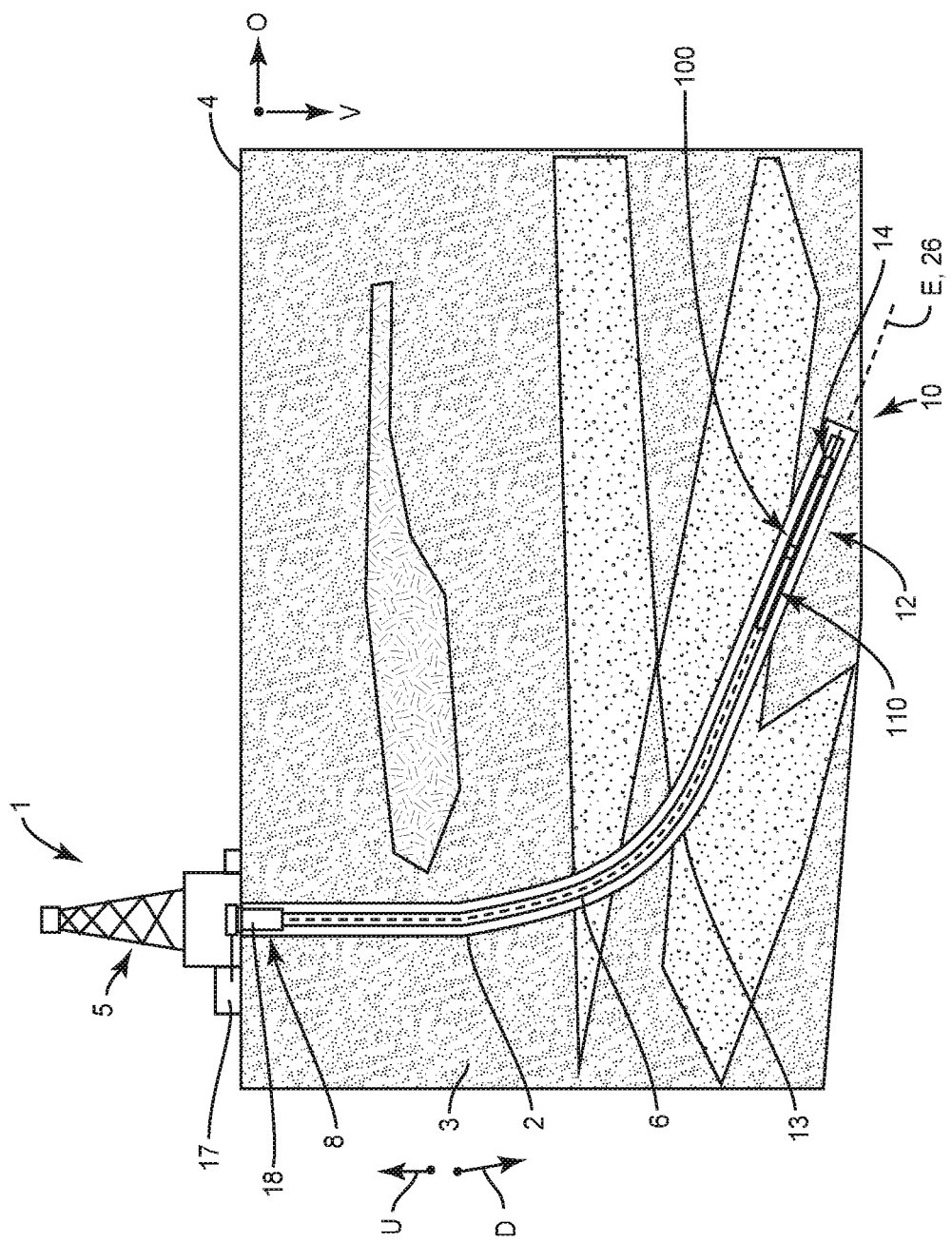
FIG. 1 is a schematic side view of a drilling system according to an embodiment of the present disclosure.

The systems, methods and software applications may be implemented during a drilling operation of a drilling systems 1 as illustrated in FIG. 1. Drilling systems 1 include a rig or derrick 5 that supports a drill string 6. The drill string 6 includes a bottomhole (BHA) assembly 12 coupled to a drill bit 14. The drill bit 14 is configured to drill a borehole or well 2 into the earthen formation 3 along a vertical direction V and an offset direction O that is offset from or deviated from the vertical direction V. The drilling system 1 can include a surface motor (not shown) located at the surface 4 that applies torque to the drill string 6 via a rotary table or top drive (not shown), and a downhole motor (not shown) disposed along the drill string 6. The downhole motor is operably coupled to the drill bit 14. The drilling system 1 is configured to operate in a rotary steering mode, where the drill string 6 and the drill bit 14 rotate, or a sliding mode where the drill string 6 does not rotate but the drill bit 14 does. Operation of the downhole motor causes the drill bit 14 to rotate along with or without rotation of the drill string 6. Accordingly, both the surface motor and the downhole motor can operate during the drilling operation to define the well 2. During the drilling operation, a pump 17 pumps drilling fluid downhole through an internal passage (not numbered) of the drill string 6 out of the drill bit 14 and back to the surface 4 through an annular passage 13 defined between the drill string 6 and well wall. The drilling system 1 can include a casing 18 that extends from the surface 4 and into the well 2. The casing 18 can be used to stabilize the formation near the surface. One or more blowout preventers can be disposed at the surface 4 at or near the casing 18.

Continuing with FIG. 1, the drill string 6 is elongate along a longitudinal central axis 26 that is aligned with a well axis E. The drill string 6 further includes an upstream end 8 and a downstream end 10 spaced from the upstream end 8 along the longitudinal central axis 26. A downhole or downstream direction D refers to a direction from the surface 4 toward the downstream end 10 of the drill string 6. Uphole or upstream direction U is opposite to the downhole direction D. Thus, "downhole" and "downstream" refers to a location that is closer to the drill string downstream end 10 than the surface 4, relative to a point of reference. "Uphole" and "upstream" refers to a location that is closer to the surface 4 than the drill sting downstream end 10, relative to a point of reference.

Figure 2A:
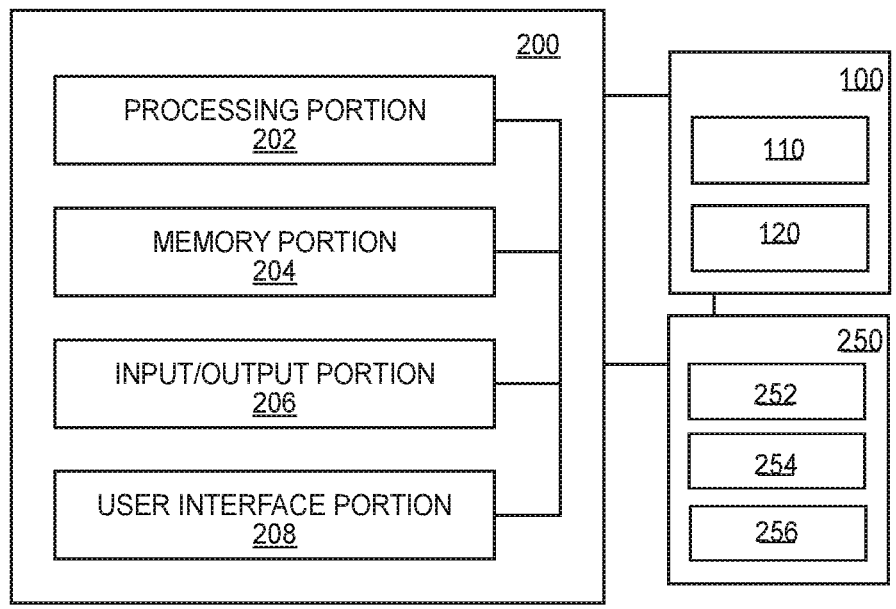
FIG. 2A is a block diagram of a computing device and telemetry system of the drilling system shown in FIG. 1.

Referring to FIG. 2A, the drilling system 1 can include one or more telemetry systems 100, one or more computing devices 200, and one or more downhole tools 110 used to obtain data concerning the drilling operation during drilling. The telemetry system 100 facilitates communication among the surface control system components and the downhole control system. The telemetry system 100 may include one or more downhole tools 110 and a surface receiver 120 for receiving data obtained from the downhole tools 110. The downhole tools 110 may be any tool designed to transmit data from a location downhole to the surface. For instance, the downhole tool may be a pulser. The telemetry system 100 can be a mud-pulse telemetry system, an electromagnetic (EM) telemetry system, an acoustic telemetry system, a wired-pipe telemetry system, or any other communication system suitable for transmitting information between the surface and downhole locations. Exemplary telemetry systems can include transmitters, receivers, and/or transceivers, along with encoders, decoders, and controllers. A mud-pulse telemetry tool is described below in connection with the signal processing methods. However, it should be appreciated that other telemetry tools could be used with the methods described herein.

Referring to FIG. 2A, as noted above the drilling system can include one or more computing devices 200 configured to receive, process, and store drilling operation information, such as directional and formation information. The drilling operation information may be obtained from downhole sensors. Any suitable computing device 200 may be configured to host a software application for monitoring, controlling, and processing the drilling information as described herein. It will be understood that the computing device 200 can include any appropriate device, examples of which include a desktop computing device, a server computing device, or a portable computing device, such as a laptop, tablet, or smart phone. In an exemplary configuration illustrated in FIG. 2A, the computing device 200 includes a processing portion 202, a memory portion 204, an input/output portion 206, and a user interface (UI) portion 208. It is emphasized that the block diagram depiction of the computing device 200 is exemplary and not intended to imply a specific implementation and/or configuration. The processing portion 202, memory portion 204, input/output portion 206, and user interface portion 208 can be coupled together to allow communications there between. As should be appreciated, any of the above components may be distributed across one or more separate devices and/or locations.

In various embodiments, the input/output portion 206 includes a receiver of the computing device 200, a transmitter of the computing device 200, or an electronic connector for wired connection, or a combination thereof. The input/output portion 206 is capable of receiving and/or providing information pertaining to communication with a network such as, for example, the Internet. As should be appreciated, transmit and receive functionality may also be provided by one or more devices external to the computing device 200. For instance, the input/output portion 206 can be in electronic communication with the surface receiver 120.

Depending upon the exact configuration and type of processor, the memory portion 204 can be volatile (such as some types of RAM), non-volatile (such as ROM, flash memory, etc.), or a combination thereof. The computing device 200 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the computing device 200.

The computing device 200 can contain the user interface portion 208, which can include an input device and/or display (input device and display not shown), that allows a user to communicate with the computing device 200. The user interface portion 208 can include inputs that provide the ability to control the computing device 200, via, for example, buttons, soft keys, a mouse, voice actuated controls, a touch screen, movement of the computing device 200, visual cues (e.g., moving a hand in front of a camera on the computing device 200), or the like. The user interface 208 can provide outputs, including visual information, such as the visual indication of the plurality of operating ranges for one or more drilling parameters via the display (not shown). Other outputs can include audio information (e.g., via a speaker), mechanical (e.g., via a vibrating mechanism), or a combination thereof. In various configurations, the user interface 208 can include a display, a touch screen, a keyboard, a mouse, an accelerometer, a motion detector, a speaker, a microphone, a camera, or any combination thereof. The user interface 208 can further include any suitable device for inputting biometric information, such as, for example, fingerprint information, retinal information, voice information, and/or facial characteristic information, for instance, so to require specific biometric information for access to the computing device 200.

Referring to FIG. 2A, the drilling system can include a data acquisition device 250 configured to receive, process, and store drilling information received from the downhole tools 110. The data acquisition device 250 may also be configured to transmit drilling information to the computing device 200. The data acquisition device 250 can include a processing portion 252, memory portion 254, and input/output portion 256. The processing portion 252 may be one or more processors. The memory portion 254 may take the form of, for example, volatile memory (such as some types of RAM), non-volatile memory (such as ROM, flash memory, etc.), or a combination thereof. The memory portion 254 may have stored thereon drilling operation information received from the downhole tools 110. The processing portion 252 may be configured to convert the signal containing the drilling information from an analog to digital format, apply a first filter to the signal (discussed below), and transmit the signal to the computing device 200. The input/output portion 256 may be used to facilitate communication with the telemetry system 100 and/or the portions of the computing device 200. The data acquisition device 250 may be contained within the computing device 200.

Figure 2B:
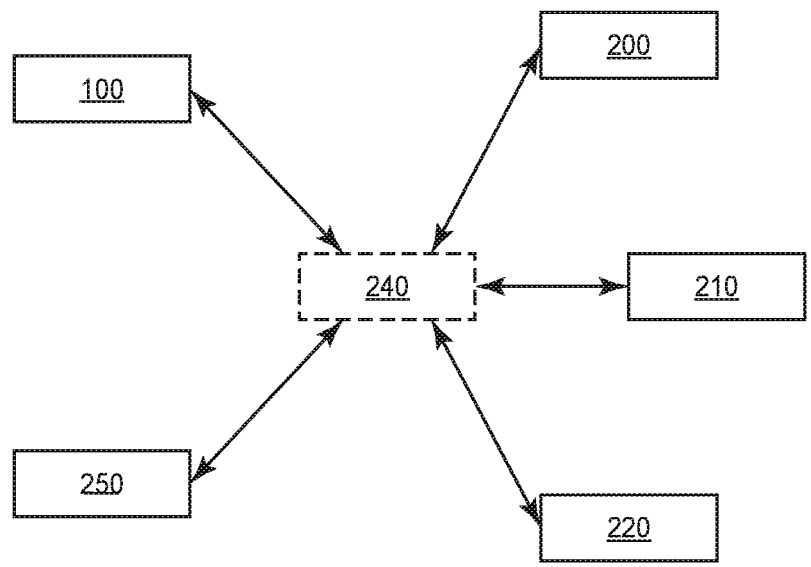
FIG. 2B is a block diagram illustrating a network of one or more computing devices and the telemetry system shown in FIG. 1.

Referring to FIG. 2B, an exemplary and suitable communication architecture is shown that can facilitate monitoring a drilling operation of the drilling system 1. Such an exemplary architecture can include one or more computing devices 200, 210, and 220, each of which can be in electronic communication with a data acquisition device 250, and the telemetry system 100 via common communications network 240. The data acquisition device 250, though schematically represented separate from the computing device 200, could also be a component of the memory portion 204 of the computing device 200. It should be appreciated that numerous suitable alternative communication architectures are envisioned. Once the drilling control and monitoring application has been installed onto the computing device 200, such as described above, it can transfer information between other computing devices on the common network 240, such as, for example, the Internet. For instance, in one configuration, a user may transmit, or cause the transmission of information via the network 240 regarding one or more drilling parameters to the computing device 210 of a supplier of the downhole tools 110, or alternatively to computing device 220 of another third party, e.g., an oil company or oil services company, via the network 240. The third party can then view, via a display, the drilling data.

The computing device 200 depicted in FIG. 2B may be operated in whole or in part by, for example, a rig operator at the drill site, a drill site owner, a drilling company, and/or any manufacturer or supplier of drilling system components, or other service provider, such as a third party providing drill string design services. As should be appreciated, each of the parties set forth above and/or other relevant parties may operate any number of respective computers and may communicate internally and externally using any number of networks including, for example, wide area networks (WAN's) such as the Internet or local area networks (LAN's). Further, it should be appreciated that "access" or "accessing" as used herein can include retrieving information stored in the memory portion of the local computing device, or sending instructions via the network to a remote computing device so as to cause information to be transmitted to the memory portion of the local computing device for access locally. In addition or alternatively, accessing can include accessing information stored in the memory portion of the remote computing device.

Figure 3:
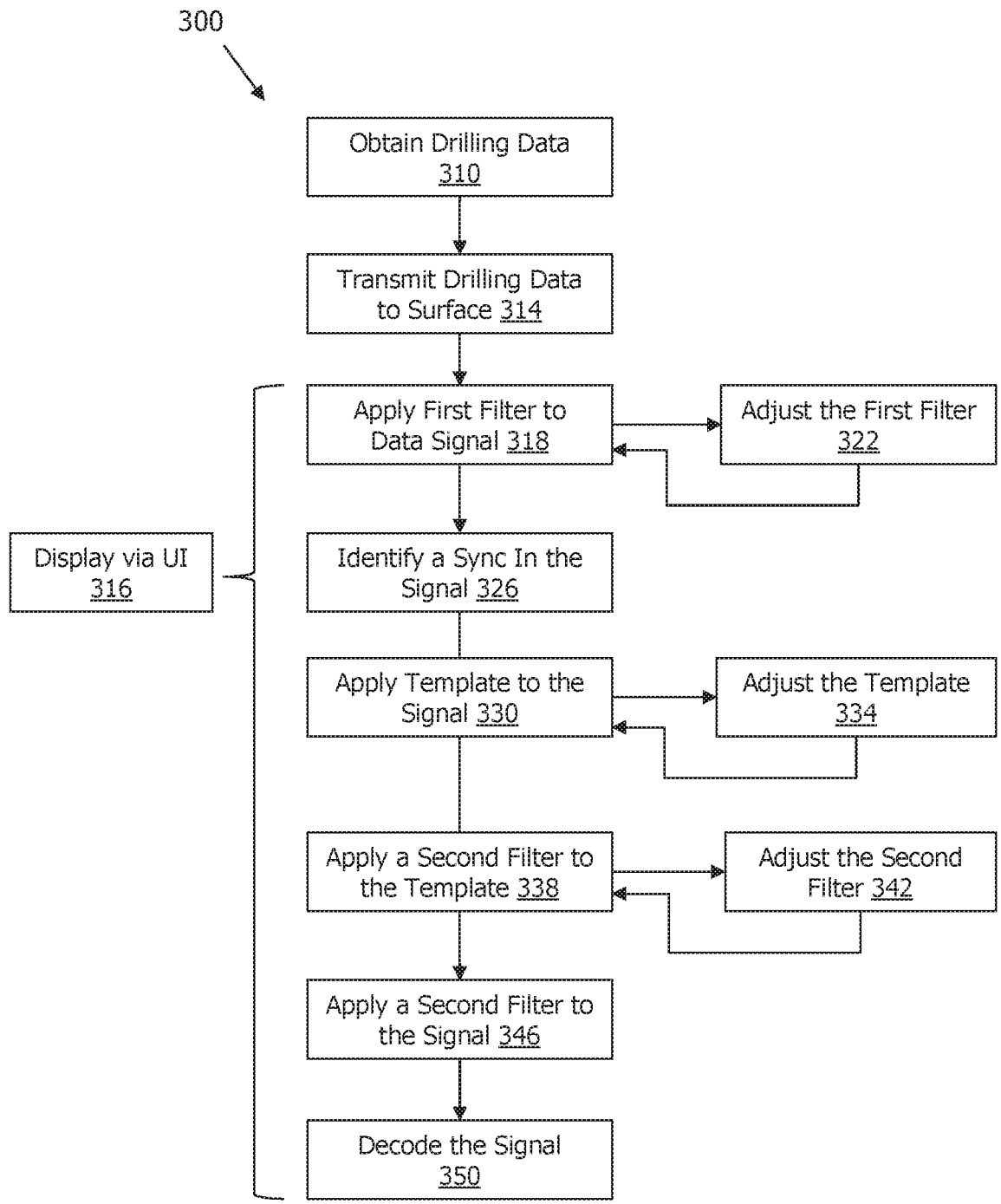
FIG. 3 is a block diagram of a method of processing drilling information according to an embodiment of the present disclosure.

FIG. 3 illustrates a method 300 for processing drilling information concerning a drilling operation. The method 300 may be initiated when the operator causes the drill string to drill a well in an earthen formation. During the drilling operation, in operation 310, drilling data is obtained from one or more downhole tools. The downhole tools may be a measurement-while-drilling (MWD), logging-while-drilling (LWD), or other downhole tool.

Operation 314 includes transmitting the drilling data to the surface. In one example, the drilling data is transmitted to the surface via a mud-pulse telemetry tool via a series of pressure pulses in the drilling mud. The series of pressure pulses define a signal and have drilling data encoded therein. The signal may be transmitted to a data acquisition device 250 and/or the computing device 200. In the example where the signal is received by the data acquisition device 250, the data acquisition device 250 transfers the signal to the computer processor. In any event, one or more communication components may receive and process the signal for further processing and display on one or more computing devices.

In operation 318, a first filter is applied to the signal. For instance, the first filter may be used to restrict the bandwidth of the signal. The first signal can be an anti-aliasing filter, such as a bandpass filter, or a low pass filter in combination with a high pass filter. The first filter may include threshold frequencies that may be preselected, default thresholds. The thresholds may be selected by the user or determined by the computing device and/or data acquisition device. The threshold frequency of the first filter may also be manually adjusted by a user or automatically adjusted by the data acquisition device and/or computing device during the course of the drilling operation.

In operation 322, the first filter may be adjusted to account for changes in the incoming data stream. Adjusting the first filter in operation 322 may be done manually or automatically.

In operation 326, a sync in the signal can be identified. A sync may be a repeated occurrence or pattern in a signal. Operation 326 may include synchronizing the transmitted signal to a data stream utilizing a predetermined sequence of pulses designated as the sync sequence. Each sync sequence indicates the transmission of a new set of drilling operation information. A sync sequence is composed of five double wide pulses followed by two single wide pulses. Alternatively, the sync sequence may be composed of eight double wide pulses and two single wide pulses. Also, the sync sequence may be composed of two double wide pulses and two single wide pulses. Other sequences may be used as well. The sync sequences can be used by the user and/or the computer processor to differentiate between different data transmissions, as well as determine the quality of the incoming signal through an analysis of the timing and duration of the sync sequences.

Operation 318 may include applying one or more format identifiers (FID) to the transmitted signal. An FID may directly follow a sync sequence of the transmitted signal. The FID of the transmitted signal indicates what type of data is to be transmitted in the signal. A person of skill in the art would know how a FID is used in signal processing. In one example, it should be appreciated that the signal may include data portions of the transmitted signal that correlate to a predetermined template. The data portions of the transmitted signal represent substantive drilling operation information that the downhole tools collect and transmit to the surface. The data portions can be in the form of a sequence of binary characters, for example a sequence of three binary characters. However, more or less binary characters can be used as desired. In one example, a first data portion of a particular data type can directly follow an FID of the transmitted signal. When a new type of data is to be transmitted, the last data portion of the previous data type transmitted can be followed by a new sync sequence portion indicating that a new data type is to be transmitted, followed by a new FID indicating the new data type to be transmitted.

In operation 330, the computer processor, based on inputs from an operator, applies (e.g., correlates) a predetermined template to the signal. This operation is used to compensate for amplitude and phase distortion induced by the first filters, thereby improving detection of the transmitted signal. In one example, the template can be applied to the sync as a sync template. One of the predetermined templates may also be an FID template. The FID templates are configured to correlate to FID's of the transmitted signal. As noted above, the FID directly follows a sync sequence portion of the transmitted signal. Thus, the predetermined template may be representative of the signal. In operation 334, the template may be adjusted to account for changes in the incoming data stream. Adjusting the template in operation 334 may be done manually or automatically.

In operation 338, the computer processor, based on inputs from the operator or internal computation by the computer processor, applies one or more adjustable filters to the predetermined template. The adjustable filter may be referred to as the second filter. In addition, in operation 342, the second filter may be adjusted to account for changes in the incoming data stream. Adjusting the second filter in operation 342 may be done manually or automatically.

In operation 346, the computer processor, based on inputs from the operator or internal computation by the computer processor, applies one or more adjustable filters to the signal. The same adjustable filter that is applied to the template in operation 338 is applied to the signal in operation 346. Furthermore, as the incoming data changes, so does the template and related filter. Accordingly, in operations 338 and 346, the computer processor applies one or more adjustable filters to the predetermined template and to the signal in a similar manner so as to improve detection of the signal.

Figure 4A:
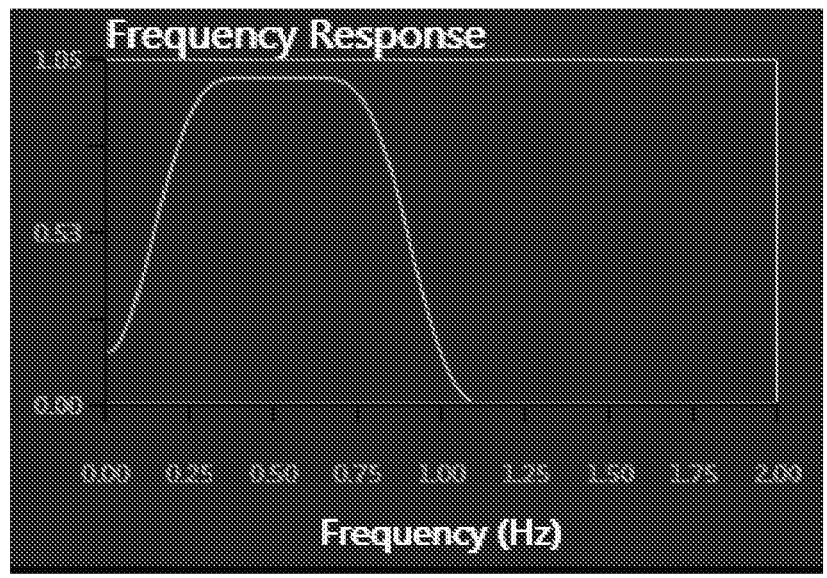
FIG. 4A illustrates a bandpass filter.
Figure 4B:
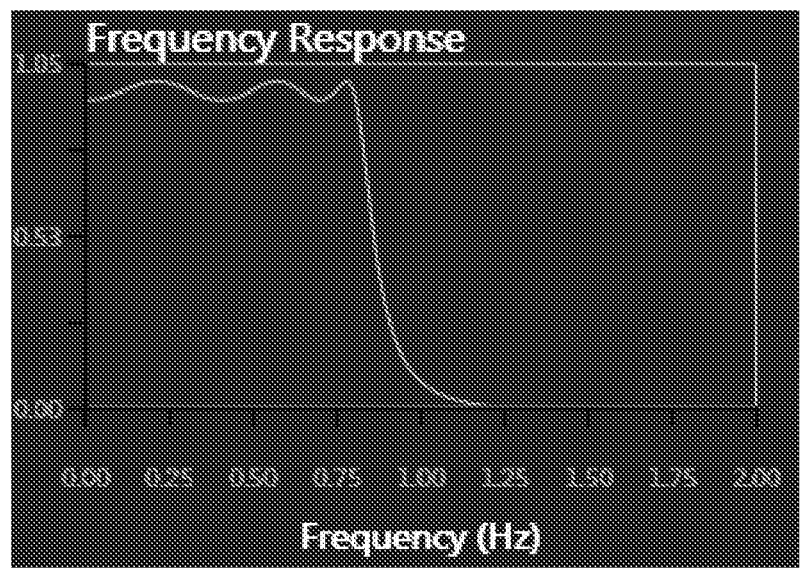
FIG. 4B illustrates low pass filter.
Figure 4C:
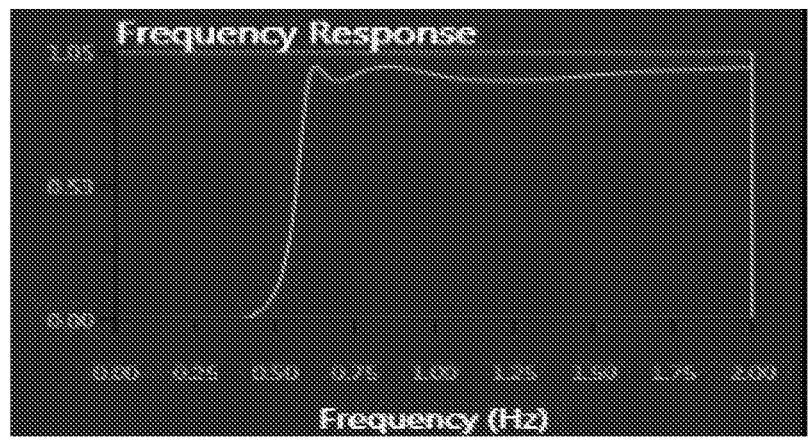
FIG. 4C illustrates a high pass filter.
Figure 4D:
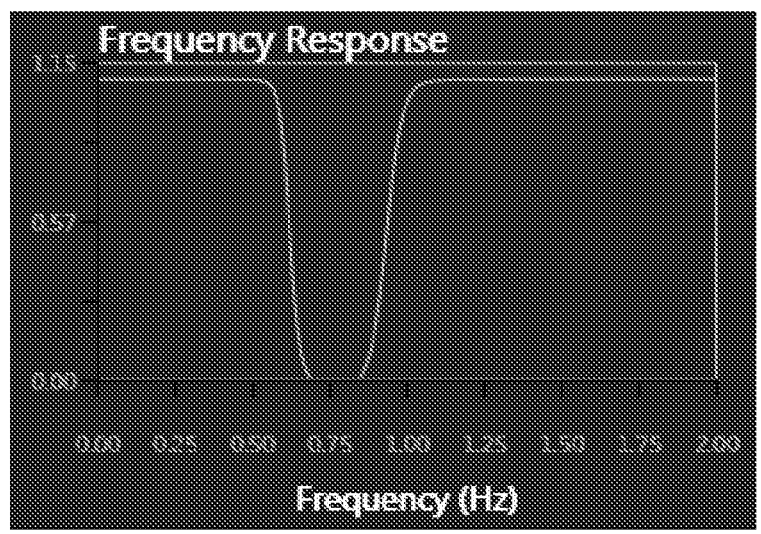
FIG. 4D illustrate a notch filter.

The one or more adjustable filters may include a bandpass filter as illustrated in FIG. 4A, a low pass filter as illustrated in FIG. 4B, a high pass filter as illustrated in FIG. 4C, and a notch filter as illustrated in FIG. 4D. Other adjustable filters may be used as well. As illustrated in FIG. 4A, the bandpass filter attenuates the signal below and above the cutoff frequencies and passes the frequencies within the cutoff frequencies. In FIG. 4B, it can be seen that the low pass filter attenuates the signal above the cutoff frequency and passes frequencies below the cutoff frequency. In FIG. 4C, a high pass filter attenuates the signal below the cutoff frequency and passes frequencies above the cutoff frequency. As shown in FIG. 4D, a notch filter attenuates the signal between the cutoff frequencies and passes frequencies above and below the cutoff frequencies. The notch filter is designed to remove specific frequency components. The filters may be embodied in any of multiple digital filtering techniques including but not limited to Finite Impulse Response (FIR), Infinite Impulse Response (IIR), Multirate, Adaptive, and Moving Average.

It should be appreciated that a single adjustable filter or multiple adjustable filters may be applied to the template and signal. For instance, the adjustable filter application operation 346 may include applying the bandpass filter. Next, a low pass filter and then a high pass filter is applied. In one example, a low pass filter may be used with a bandpass filter when the transmitted signal includes high frequency noise. Alternatively, a high pass filter may be used with a bandpass filter when the transmitted signal includes low frequency noise. Furthermore, the operation 346 may include applying a notch filter with the bandpass filter when the transmitted signal includes noise within the bandpass.

Each adjustable filter may include initial threshold frequencies that may be preselected default thresholds, preselected by the user, or determined by the data acquisition device. The threshold frequencies of each adjustable filter can be manually adjusted by the user in response to new or changed properties of the transmitted signal. Alternatively, the computer processor can analyze the incoming transmitted signal and automatically adapt the threshold frequency based on a prediction of what the incoming transmitted signal will look like in the future. The automatic adjustment feature reduces the burden on the user by removing the requirement that the user constantly monitor the transmitted signal and alter the filter threshold.

In operation 350, the signal is decoded. In one example of operation 350, decoding the transmitted signal is based on the best match between a) two or more of the plurality of predetermined templates for an encoding scheme, and b) the transmitted signal. In such an example, as discussed above, two or more of the plurality of predetermined templates and the transmitted signal are processed through the same adjustable filter of the second adjustable filters.

The method may also include continuously monitoring the transmitted signal and comparing the transmitted signal to the two or more predetermined templates to ensure that the two or more predetermined templates still match the transmitted signal. Should a time arise where the transmitted signal changes to an extent that it no longer matches the two predetermined templates, the cycle of adjusting the templates and filters can be repeated.

Figure 5:
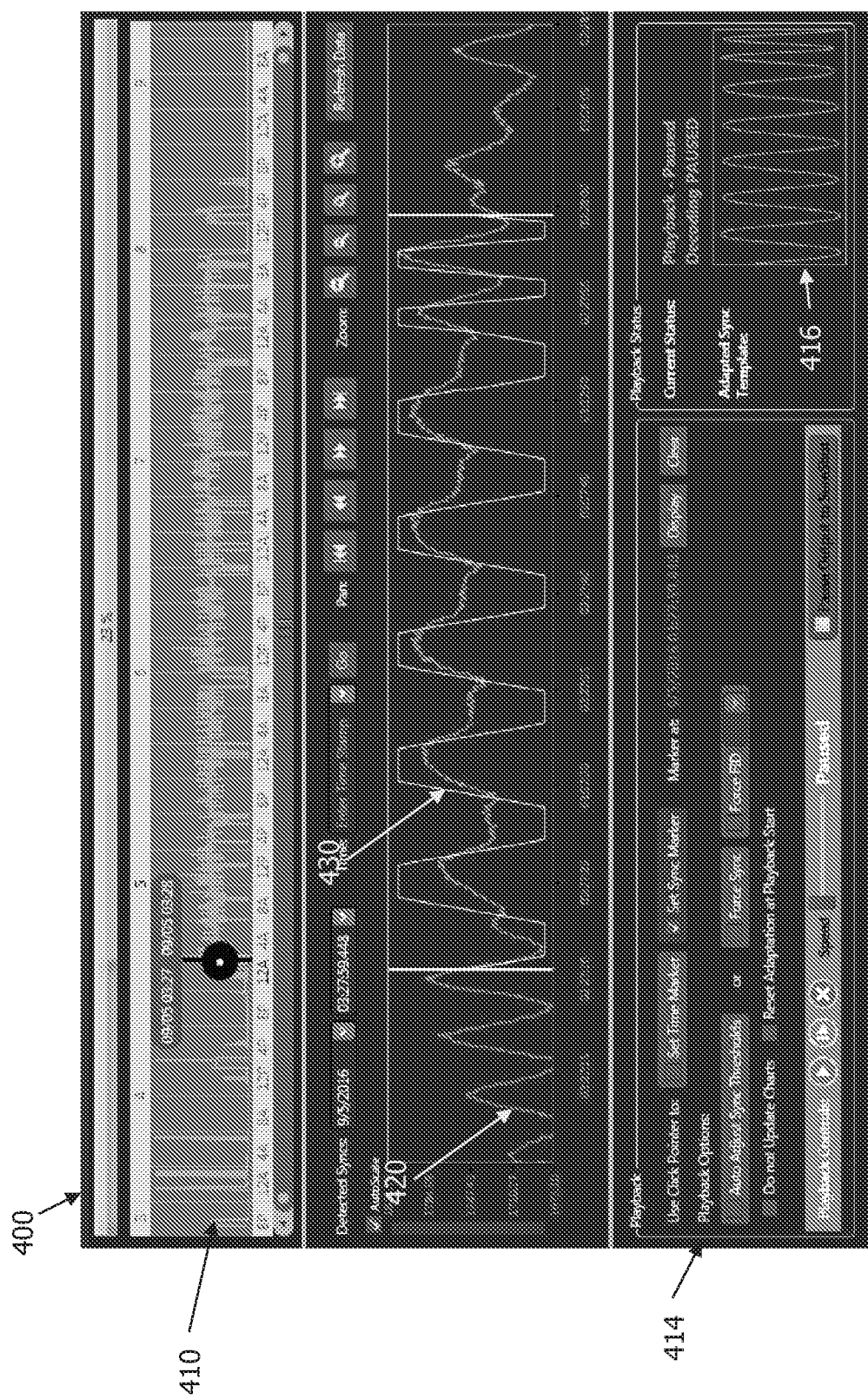
FIG. 5 is a display of a graphical user interface illustrating a signal and a template.

The method further includes operation 316, which includes displaying the transmitted signal and adjustable filters via the user interface 300 as shown in FIGS. 5-8. As shown in FIG. 5, the user interface generates a display 400 on a screen of a computing device of various aspects of the method 300. The display 400 can include a playback window 410 that includes the raw data, input elements 414 for controlling the playback window 410, a data signal 420, and a sync template 430. The sync template 430 is shown overlaid on the signal 420 in a separate window 416.

Figure 6:
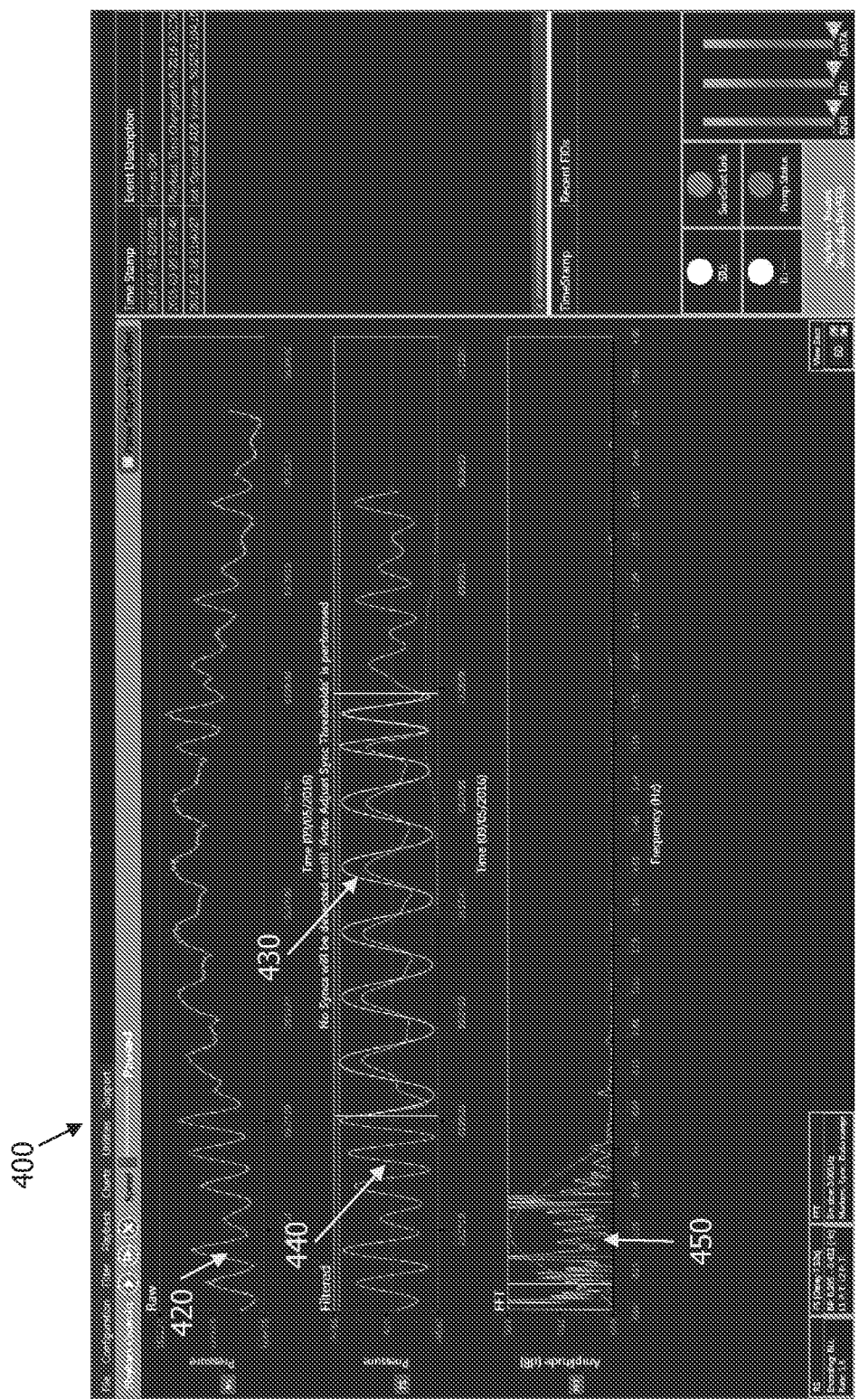
FIG. 6 is a display of a graphical user interface illustrating a signal and a filtered signal and a filtered template overlaid on a sync.
Figure 7:
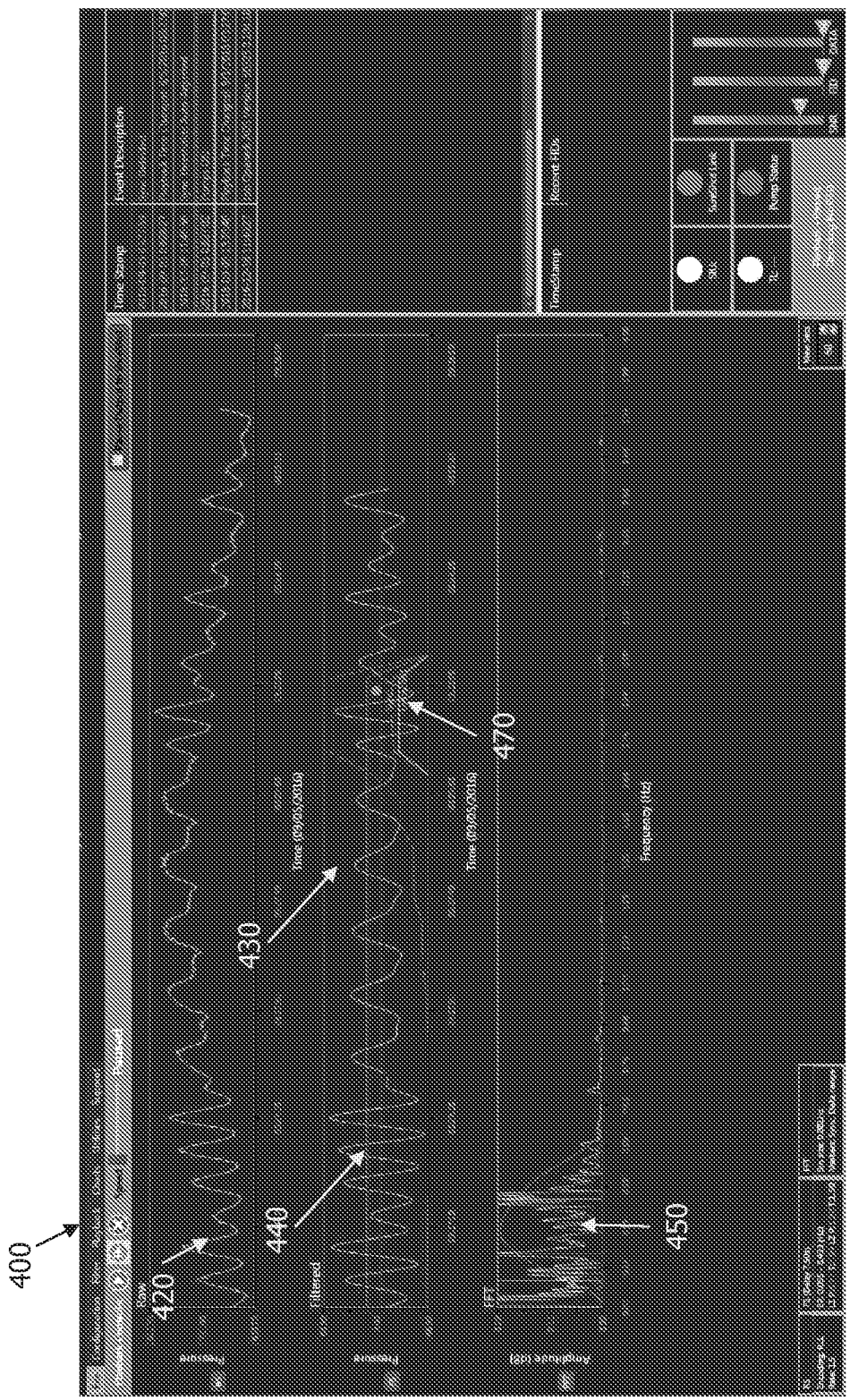
FIG. 7 is a display of a graphical user interface illustrating a signal and a filtered signal and a filtered template adjusted based on an incoming signal.
Figure 8:
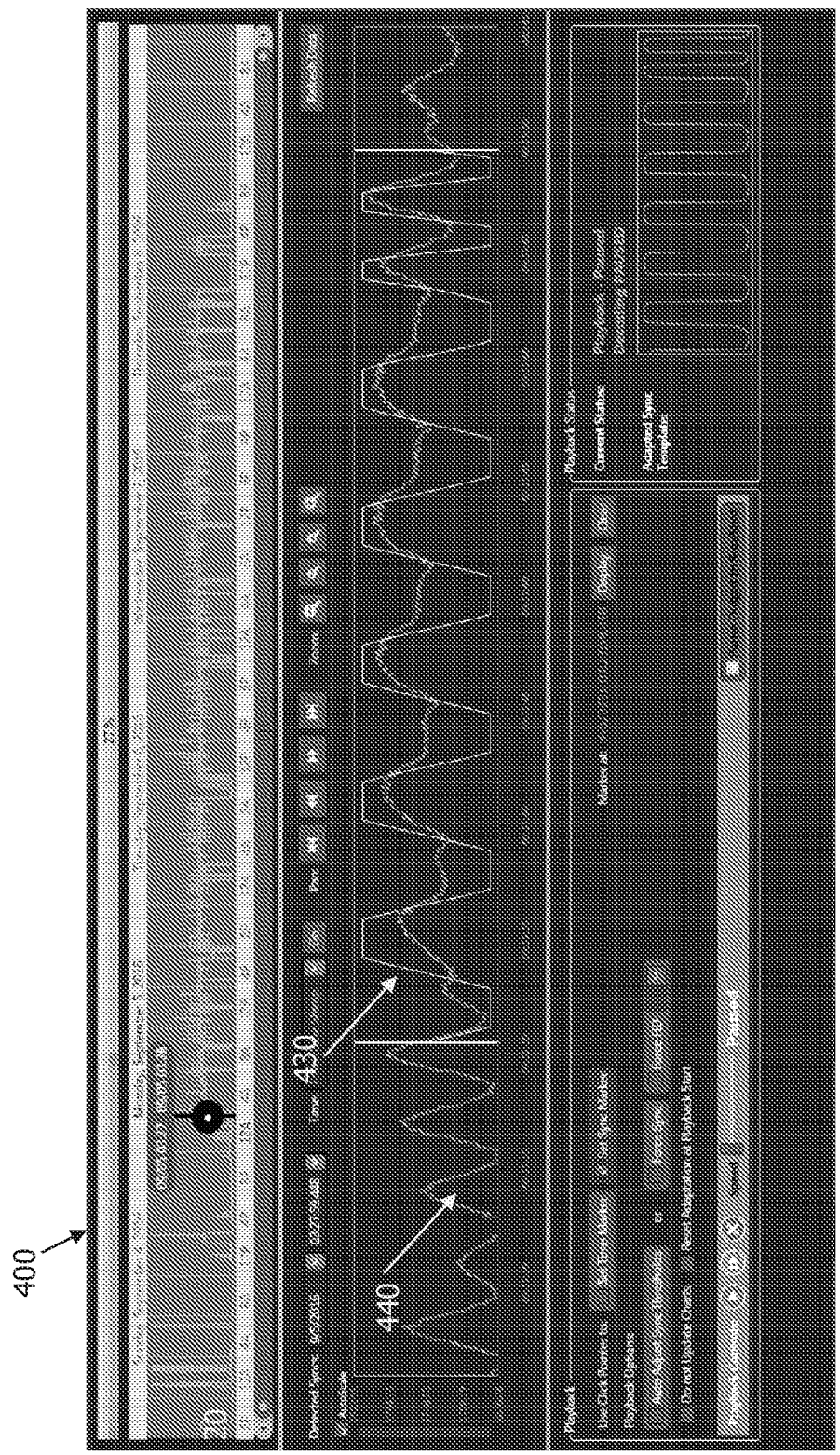
FIG. 8 is a display of a graphical user interface illustrating the filtered signal and the filtered template after further adjustment.

As shown in FIG. 6, the user interface 400 can display a data signal 420, a filtered signal 440, a sync template 430, and a Fast Fourier Transform (FFT) chart 450. The FFT chart 450 can include an incoming signal frequency response of the transmitted signal before the first and second filters are applied to the transmitted signal, as well as a signal frequency response of the transmitted signal after the first and second filters are applied to the transmitted signal. FIG. 7 illustrates how the sync 470 in the data signal 420 can be detected and adjusted. FIG. 8 illustrates how the sync template 430 adjusts over time to account for changes in the incoming data stream. The methods described herein improve signal detection and reduce signal noise in a unique way. The method permits operators to view, analyze and adjust signal processing in real-time to obtain more robust data sets.

What is claimed:

1. A method for processing drilling data obtained via one or more downhole tools, the method comprising the steps of:
    transmitting a signal to a computer processor, wherein the signal includes the drilling data encoded therein;
    applying one or more first filters to the transmitted signal;
    applying a plurality of predetermined templates to the transmitted signal;
    applying one or more second, adjustable filters to the transmitted signal and to the plurality of predetermined templates;
    decoding the transmitted signal based on the best match between a) two or more of the plurality of predetermined templates, and b) the transmitted signal, wherein the two or more of the plurality of predetermined templates and the transmitted signal are processed through the same adjustable filter of the one or more second, adjustable filters.

2. The method of claim 1, further comprising the step of displaying, via a user interface, the signal and the one or more second, adjustable filters.

3. The method of claim 1, wherein the step of applying the plurality of predetermined templates includes utilizing a correlation engine.

4. The method of claim 1, wherein the one or more first filters include an anti-aliasing filter configured to restrict a bandwidth of the transmitted signal.

5. The method of claim 1, wherein at least one of the plurality of predetermined templates is a sync template.

6. The method of claim 5, wherein the sync template is composed of one of:
a) five double wide pulses followed by two single wide pulses,
b) eight double wide pulses followed by two single wide pulses, or
c) two double wide pulses followed by two single wide pulses.

7. The method of claim 1, wherein one of the one or more second, adjustable filters is a bandpass filter, wherein the step of applying one or more second, adjustable filters includes applying the bandpass filter.

8. The method of claim 7, wherein one of the one or more second, adjustable filters is a low pass filter, wherein the step of applying one or more second, adjustable filters includes applying the low pass filter.

9. The method of claim 7, wherein of one of the one or more second, adjustable filters is a high pass filter, wherein the step of applying one or more second, adjustable filters includes applying the high pass filter.

10. The method of claim 7, wherein one of the one or more second, adjustable filters is a notch filter, wherein the step of applying one or more second, adjustable filters includes applying one or more notch filters.

11. The method of claim 7, wherein the step of applying one or more second, adjustable filters includes applying at least two of a low pass filter, a high pass filter, and a notch filter.

12. The method of claim 1, further comprising the step of applying one or more format identifiers to the transmitted signal, the format identifiers indicating a type of data to be transmitted.

13. The method claim 1, further comprising the steps of:
causing a drillstring to drill a well in an earthen formation; and
causing drilling mud to flow through the drillstring.

14. The method of claim 13, wherein the transmitting steps includes the step of initiating a series of pressure pulses in the drilling mud, the series of pressure pulses defining the signal.

15. A system, comprising:
the computer processor;
a computer memory; and
one or more software applications, that when executed by the computer processor, perform the method according to claim 1.

16. The system of claim 15, further comprising a mud-pulse telemetry tool configured to transmit the signal through drilling mud.

17. A computer program product configured to be stored on a non-transitory computer readable medium, the computer program product configured to, when executed by a computer processor, perform the method according to claim 1.

18. The method of claim 1, wherein one of the one or more second, adjustable filters is a low pass filter, and another of the one or more second, adjustable filters is a high pass filter, wherein the step of applying one or more second, adjustable filters includes applying the low pass filter and the high pass filter.

19. The method of claim 1, further comprising the step of manually altering the one or more second, adjustable filters based upon changes in the transmitted signal to produce one or more updated second filters.

20. The method of claim 1, further comprising the step of automatically adjusting, via the computer processor, the one or more second, adjustable filters to produce one or more updated second filters.

21. The method of claim 1, further comprising the step of manually adjusting the one or more first filters based upon changes in the transmitted signal to produce one or more updated first filters.

22. A graphical user interface configured to run on a computer device and configured to display output elements generated by the method of claim 21.

23. A graphical user interface configured to run on a computer device and configured to display output elements generated by the method of claim 1.

24. A system for processing drilling data transmitted from downhole tools in a drilling operation, the system comprising:
a computer processor configured to:
apply one or more first filters to a signal transmitted from a tool that contains the drilling data encoded therein;
apply a plurality of predetermined templates to the signal, wherein the predetermined templates are representative of possible combinations of a data stream for an encoding format in the transmitted signal;
apply one or more second, adjustable filters to the transmitted signal and to the plurality of predetermined templates; and
decode the transmitted signal based on the best match between a) two or more of the plurality of predetermined templates, and b) the transmitted signal, wherein the two or more of the plurality of predetermined templates and the transmitted signal are processed through the same adjustable filter of the one or more second, adjustable filters.

25. The system of claim 24, further comprising a user interface configured to display the signal and the one or more second, adjustable filters.

26. The system of claim 24, wherein the one or more first filters include an anti-aliasing filter.

27. The system of claim 24, wherein the one or more second, adjustable filters is a bandpass filter, a low pass filter, a high pass filter, or a notch filter.

28. The method of claim 24, wherein the computer processor is configured to automatically adjust the one or more second, adjustable filters to produce one or more updated second filters.

29. The system of claim 28, wherein the computer processor is further configured to apply the one or more updated second filters to the transmitted signal and to the plurality of predetermined templates to compensate for amplitude and phase distortion induced by the first filters, as well as changes in the transmitted signal, thereby improving detection of the transmitted signal.

* * * * *